(No Model.)
J. RHOADS.
REMOVABLE LIP FOR CUPS, BOTTLES, &c.
No. 280,515. Patented July 3, 1883.
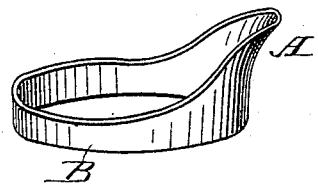
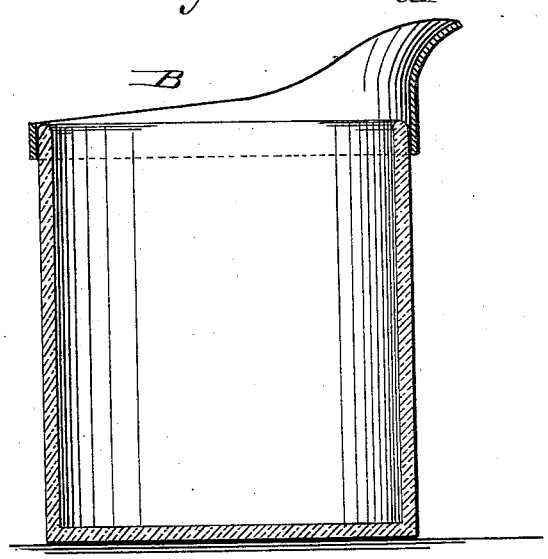
WITNESSES:
Francis McArdle.
C. Sedgwick
INVENTOR:
J. Rhoads
BY Munn & Co
ATTORNEYS.

UNITED STATES PATENT OFFICE.

JACOB RHOADS, OF WATSONTOWN, ASSIGNOR TO HIMSELF AND EDGAR K RHOADS, OF MAHANOY CITY, PENNSYLVANIA.

REMOVABLE LIP FOR CUPS, BOTTLES, &c.

SPECIFICATION forming part of Letters Patent No. 280,515, dated July 3, 1883.

Application filed April 19, 1883. (No model.)

*To all whom it may concern:*

Be it known that I, JACOB RHOADS, of Watsontown, in the county of Northumberland and State of Pennsylvania, have invented a new and Improved Removable Lip for Cups, Bottles, and other Vessels, of which the following is a full, clear, and exact description.

The object of my invention is to provide a new and improved lip or spout that can be attached to cups, bottles, or other vessels for pouring liquids from the vessel without spilling or having the same run down the side of the vessel.

The invention consists in a lip made integral with or attached to an elastic band or other device for holding it on a cup, bottle, or other vessel.

Reference is to be had to the accompanying drawings, forming part of this specification, in which similar letters of reference indicate corresponding parts in both the figures.

Figure 1 is a perspective view of my improved removable lip for cups, bottles, and other vessels. Fig. 2 is a cross-sectional elevation of a cup to which my improved lip is attached.

A lip, A, is made integral with an elastic band, B, or is attached to the same in some suitable manner, so that if the band B is passed around the vessel, at or directly below the upper edge of the same, the lip will be held o the vessel and will project from the edge the same, as shown. A liquid can then k poured from the vessel without spilling any the liquid or having it run down the sides the vessel, and the flow of the liquid can l checked more readily than if the vessel we not provided with the lip.

The lip and the band can be made of any d sired size. The lip can be made of one piece rubber with the band, or the lip can be made metal, porcelain, glass, hard rubber, celluloi &c., and can be attached to a band of rubbe or any other elastic band—such as an annul coiled spring, &c.—or to a spring for clampii it on the vessel. The lip can be held on cuf bottles, measures, tumblers, or any other v( sel, and can be removed and secured on a other vessel if the first has been emptied a is used no longer.

Having thus described my invention, I cla as new and desire to secure by Letters Patent

An elastic band, B, provided with a lip, substantially as herein shown and describe and for the purpose set forth.

JACOB RHOADS

Witnesses:
 GEO. W. HESS,
 JAMES McMAHAN.